United States Patent
Lee et al.

(10) Patent No.: US 10,112,154 B2
(45) Date of Patent: Oct. 30, 2018

(54) POLYAMIDE-BASED WATER-TREATMENT SEPARATION MEMBRANE HAVING EXCELLENT DURABILITY, AND MANUFACTURING METHOD THEREFOR

(71) Applicant: LG CHEM, LTD., Seoul (KR)

(72) Inventors: Youngju Lee, Daejeon (KR); Chong Kyu Shin, Daejeon (KR); Phill Lee, Daejeon (KR); Byungho Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 321 days.

(21) Appl. No.: 14/908,973

(22) PCT Filed: Aug. 1, 2014

(86) PCT No.: PCT/KR2014/007144
§ 371 (c)(1),
(2) Date: Jan. 29, 2016

(87) PCT Pub. No.: WO2015/016683
PCT Pub. Date: Feb. 5, 2015

(65) Prior Publication Data
US 2016/0166993 A1    Jun. 16, 2016

(30) Foreign Application Priority Data

Aug. 1, 2013  (KR) .................. 10-2013-0091789
Aug. 1, 2013  (KR) .................. 10-2013-0091790
Aug. 1, 2014  (KR) .................. 10-2014-0099163

(51) Int. Cl.
| B01D 71/56 | (2006.01) |
| B01D 67/00 | (2006.01) |
| B01D 69/02 | (2006.01) |
| B01D 69/12 | (2006.01) |
| B01D 71/28 | (2006.01) |

(52) U.S. Cl.
CPC ......... *B01D 71/56* (2013.01); *B01D 67/0093* (2013.01); *B01D 69/02* (2013.01); *B01D 69/12* (2013.01); *B01D 71/28* (2013.01); *B01D 2325/04* (2013.01); *B01D 2325/28* (2013.01)

(58) Field of Classification Search
None
See application file for complete search history.

(56) References Cited

U.S. PATENT DOCUMENTS

| 4,559,139 | A  | * | 12/1985 | Uemura ............... | B01D 69/125 |
| | | | | | 210/490 |
| 5,543,465 | A  | * | 8/1996  | Bell ................... | B01D 67/0011 |
| | | | | | 210/500.28 |
| 6,177,011 | B1 |   | 1/2001  | Hachisuka et al. | |
| 9,884,146 | B2 | * | 2/2018  | Mullick ............... | A61M 1/3672 |
| 2006/0121217 | A1 | | 6/2006 | Childs et al. | |
| 2007/0284309 | A1 | | 12/2007 | Tomioka | |
| 2008/0251447 | A1 | | 10/2008 | Koumoto et al. | |
| 2011/0009799 | A1 | * | 1/2011 | Mullick ............... | A61M 1/3672 |
| | | | | | 604/6.14 |
| 2011/0120937 | A1 | | 5/2011 | Ishizuka et al. | |
| 2013/0213880 | A1 | * | 8/2013 | Hirozawa .......... | B01D 67/0006 |
| | | | | | 210/483 |
| 2015/0008179 | A1 | * | 1/2015 | Mullick ............... | A61M 1/3672 |
| | | | | | 210/500.23 |
| 2017/0144111 | A1 | * | 5/2017 | Mok ................... | B01D 67/0086 |

FOREIGN PATENT DOCUMENTS

| CN | 101219344 A | 7/2008 | | |
| EP | 2241440 | 10/2010 | | |
| JP | H7-773 A | 1/1995 | | |
| JP | 2004025102 A | 1/2004 | | |
| JP | 2006095480 A | 4/2006 | | |
| JP | 2008093543 A | 4/2008 | | |
| JP | 2008517737 A | 5/2008 | | |
| JP | 2010247524 | 11/2010 | | |
| JP | 2011110474 A | 6/2011 | | |
| JP | 2012501830 A | 1/2012 | | |
| KR | 10-2007-0062988 A | 6/2007 | | |
| KR | 10-2011-0079153 A | 7/2011 | | |
| WO | 02/15299 A1 | 2/2002 | | |
| WO | 2010030357 A2 | 3/2010 | | |
| WO | 2010082710 A1 | 7/2010 | | |
| WO | 2012/057028 A1 | 5/2012 | | |
| WO | WO-2012057028 A1 * | 5/2012 | ......... | B01D 67/0006 |

* cited by examiner

*Primary Examiner* — Clare M Perrin
(74) *Attorney, Agent, or Firm* — Dentons US LLP

(57) ABSTRACT

The present invention relates to a water treatment separation membrane having improved durability and including a porous support; a polyamide active layer formed on the porous support; and a protective layer formed on the polyamide active layer and including polyvinyl pyrrolidone, wherein a thickness of the protective layer is 0.5 nm to 1000 nm, and a method for manufacturing the same.

17 Claims, No Drawings

POLYAMIDE-BASED WATER-TREATMENT SEPARATION MEMBRANE HAVING EXCELLENT DURABILITY, AND MANUFACTURING METHOD THEREFOR

This application is a National Stage Entry of International Application No. PCT/KR2014/007144, filed Aug. 1, 2014, and claims the benefit of and priority to Korean Application No. 10-2013-0091789, filed Aug. 1, 2013, Korean Application No. 10-2013-0091790, filed Aug. 1, 2013, and Korean Application No. 10-2014-0099163, filed Aug. 1, 2014, all of which are incorporated herein by reference in their entirety for all purposes as if fully set forth herein.

TECHNICAL FIELD

The present disclosure relates to a polyamide-based water treatment separation membrane and a method for manufacturing the same, and in particular, to a polyamide-based water treatment separation membrane improving durability by forming a protective layer that includes polyvinyl pyrrolidone on a polyamide active layer, and capable of being stored and distributed in a dried state, and a method for manufacturing the same.

BACKGROUND ART

Developing a new source of water resources has surfaced as an urgent facing problem due to recent serious pollution of water quality environments and water shortage. Researches on the pollution of water quality environments aim for high-quality residential and industrial water, and treatment of various domestic sewage and industrial wastewater, and interests in water treatment processes using a separation membrane having an advantage of energy saving has been rising. In addition, accelerated reinforcement on environment regulations is expected to advance wide utilization of separation membrane technologies. Traditional water treatment processes are difficult to satisfy the tightened regulations, however, separation membrane technologies secure excellent treatment efficiency and stable treatment, therefore are expected to become a leading technology in the field of water treatment in the future.

Liquid separation is divided into microfiltration, ultrafiltration, nanofiltration, reverse osmosis, stannizing, active transport, electrodialysis, and the like, depending on the pore of the membrane.

Specifically, typical examples of such a water treatment separation membrane include a polyamide-based water treatment separation membrane, and the polyamide-based water treatment separation membrane is manufactured using a method in which a fine porous support is formed by forming a polysulfone layer on nonwoven fabric, and this fine porous support is immersed in an aqueous m-phenylenediamine (mPD) solution to form an mPD layer, and this mPD layer brings in contact with trimesoyl chloride (TMC) by being immersed in a TMC organic solvent or being coated, and is interfacial polymerized to form a polyamide active layer. According to the preparation method described above, a non-polar solvent and a polar solvent are contacted, and polymerization occurs only at the interface, and as a result, a polyamide active layer having a very small thickness is formed.

Meanwhile, there is a qualification for a polyamide-based water treatment separation membrane to be commercially used, and it is having superior capabilities as a separation membrane such as high salt rejection and permeate flow. Salt rejection of a separation membrane commercially required is at least 97% or greater for brackish water, and an ability to have a relatively large amount of water passing through under a relatively low pressure, that is, a high flow property is required.

Meanwhile, together with improving efficiency such as salt rejection and permeate flow of a separation membrane, having high durability against damage and scratches that may occur during manufacturing and modularization processes of a separation membrane, and preventing the contamination of a membrane has recently become an important issue.

In manufacturing and modularization processes of a polyamide-based water treatment separation membrane, the separation membrane needs to go through various processes, and damage and scratches frequently occur on the membrane surface during such processes. A method of forming a polyvinyl alcohol-based coating layer on the surface of a polyamide active layer has been proposed in order to solve such a problem. However, when a polyvinyl alcohol-based coating layer is present on a polyamide active layer, there is a problem in that an active surface area of the polyamide active layer surface decreases due to the coating layer causing significant decrease in permeate flow and salt rejection properties. Accordingly, the coating layer is preferably removed after completing a modularization process in order to improve permeate flow, however, high-temperature water needs to be used to remove the coating layer since polyvinyl alcohol is not favorably dissolved in water at room temperature, and in this case, a problem of damaging the polyamide active layer occurs in the coating membrane removal process.

In addition, in existing polyamide-based water treatment separation membranes, pores of the active layer shrink or moisture content decreases when the polyamide active layer is dried, which causes significant decrease in salt rejection and permeate flow, therefore, separation membranes have always needed to be stored and distributed in a wet state causing inconvenience. This has caused problems in that it lowers economic feasibility of processes, and makes transport and handling difficult.

DISCLOSURE

Technical Problem

In view of the above, an object of the present invention is to provide a polyamide-based water treatment separation membrane having excellent durability and salt rejection by forming a protective layer including a specific compound on a polyamide active layer, and capable of being stored or distributed in a dried state since membrane efficiency is maintained even after drying the separation membrane.

Technical Solution

In one aspect, the present invention provides a water treatment separation membrane including a porous support; a polyamide active layer formed on the porous support; and a protective layer formed on the polyamide active layer and including polyvinyl pyrrolidone, wherein a thickness of the protective layer is 0.5 nm to 1000 nm.

Herein, a weight average molecular weight of the polyvinyl pyrrolidone is preferably 10,000 to 1,000,000, and a solubility value of the polyvinyl pyrrolidone for water is preferably 5% or greater at 25° C.

Herein, the protective layer may further include a polymer including an amine group-containing compound, an epoxy group-containing compound and a fluoro-containing compound. Herein, the protective layer may be a single protective layer, or two protective layers formed with a first protective layer including a polymer that includes an amine group-containing compound, an epoxy group-containing compound and a fluoro-containing compound, and a second protective layer formed on the first protective layer and including polyvinyl pyrrolidone.

Meanwhile, the water treatment separation membrane of the present invention preferably has moisture content of 1% to 8%.

Meanwhile, the water treatment separation membrane of the present invention may have a salt rejection change ratio of 1% or less after scraping the surface once at a rate of 30 mm/s using a bar coater (#50 wired bar), and a permeate flow change ratio of 12% or less, and in a dried state, salt rejection is approximately 99.3% or greater, and permeate flow is approximately 30 to 45 gallon/ft$^2$·day.

In another aspect, the water treatment separation membrane of the present invention may be a water treatment separation membrane manufactured by washing a water treatment separation membrane formed with the polyvinyl pyrrolidone protective layer 1 to 5 times using water.

Herein, the water treatment separation membrane may have a permeate flow change ratio of 10% or less after passing through an aqueous solution mixed with an aqueous sodium chloride solution having a concentration of 32,000 ppm and albumin having a concentration of 100 ppm for 6 hours, compared to initial permeate flow.

Meanwhile, the porous support of the water treatment separation membrane of the present invention may be a microfiltration membrane, an ultrafiltration membrane, a nanofiltration membrane or a reverse osmosis membrane.

In another aspect, the present invention provides a water treatment module including at least one or more of the water treatment separation membranes, and water treatment equipment including at least one or more of the water treatment modules.

In still another aspect, the present invention provides a method for manufacturing a water treatment separation membrane, which includes forming a polyamide active layer on a porous support; and forming a protective layer on the polyamide active layer using an aqueous solution including 0.005% by weight to 7% by weight of polyvinyl pyrrolidone based on the whole aqueous solution.

Herein, an operation of drying for 5 minutes to 30 minutes at 25° C. to 65° C. may be further included after forming the protective layer.

Herein, the operation of forming the protective layer may include forming a first protective layer on the polyamide active layer using an aqueous solution including an amine group-containing compound, an epoxy group-containing compound and a fluoro-containing compound; and forming a second protective layer on the top of the first protective layer using an aqueous solution including polyvinyl pyrrolidone, or may include mixing an aqueous solution including polyvinyl pyrrolidone and an aqueous solution including an amine group-containing compound, an epoxy group-containing compound and a fluoro-containing compound, and coating the result.

Advantageous Effects

A water treatment separation membrane of the present invention forms a protective layer including polyvinyl pyrrolidone on a polyamide active layer, therefore, has high resistance against scratches at the membrane surface and peeling off, and accordingly, has excellent durability.

In addition, the water treatment separation membrane of the present invention has an advantage in that pore shrinkage or moisture content decrease of a polyamide active layer is prevented even in a dried state due to the presence of a polyvinyl pyrrolidone protective layer, therefore, the membrane may be stored and distributed in a dried state.

Furthermore, the polyvinyl pyrrolidone protective layer of the present invention is readily dissolved in water at room temperature, thereby is readily removed through washing without a separate process after a modularization process, and as a result, a problem of decrease in permeate flow and salt rejection abilities of a polyamide active layer caused by the presence of a protective layer may be solved.

In addition, the water treatment separation membrane of the present invention is effective in improving an anti-fouling property of a polyamide active layer since a small amount of a polyvinyl pyrrolidone component remains in the polyamide active layer even after washing.

Meanwhile, when the protective layer further includes a polymer including an amine group-containing compound, an epoxy group-containing compound and a fluoro-containing compound, permeate flow decrease due to contaminants is significantly reduced, therefore, an excellent anti-fouling property is exhibited.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As a result of extensive studies for manufacturing a water treatment separation membrane having excellent durability, and capable of being distributed in a dried state, the inventors of the present invention have found that, when a water treatment separation membrane includes a protective layer that is formed on a polyamide active layer formed on a porous support, and that includes polyvinyl pyrrolidone, the membrane has high durability with small salt rejection and permeate flow change ratios by the scratches and peeling of the membrane surface, and salt rejection and permeate flow of the polyamide active layer barely decrease even when the membrane is distributed in a dried state, and completed the present invention.

Accordingly, the present invention provides a water treatment separation membrane including a (1) porous support, a (2) polyamide active layer formed on the porous support, and a (3) protective layer formed on the polyamide active layer and including polyvinyl pyrrolidone, wherein the thickness of the protective layer is 0.5 nm to 1000 nm.

As the (1) porous support, those in which a coating layer made of polymer materials is formed on nonwoven fabric may be used, and examples of the polymer material include polysulfone, polyethersulfone, polycarbonate, polyethylene oxide, polyimide, polyetherimide, polyetherketone, polypropylene, polymethylpentene, polymethyl chloride and polyvinylidene fluoride and the like, but are not limited thereto. Among these, polysulfone is particularly preferable.

Meanwhile, the (2) polyamide active layer formed on the porous support may be formed by interface polymerization of an amine compound and an acyl halide compound, and herein, examples of the amine compound preferably include, but are not limited to, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or a mixture thereof. In addition, the acyl halide compound is an aromatic compound having two to three carboxylic acid halides, and examples thereof preferably include, but are not limited to, trimesoyl chloride, isophthaloyl chloride, terephthaloyl chloride, or a mixture thereof.

Next, the water treatment separation membrane of the present invention includes a (3) protective layer formed on the polyamide active layer and including polyvinyl pyrrolidone, and the thickness of the protective layer ranges from 0.5 nm to 1000 nm.

The protective layer including polyvinyl pyrrolidone may be formed using an aqueous solution including polyvinyl pyrrolidone, and for example, and may be formed by coating an aqueous solution containing polyvinyl pyrrolidone-containing on the surface of the polyamide active layer, and drying the result.

Meanwhile, the polyvinyl pyrrolidone (PVP) plays a role of providing resistance against external physical stimulus by forming one additional layer as it physically binds on the polyamide active layer.

Herein, in the present invention, the polyvinyl pyrrolidone preferably includes a repeating unit represented by the following [Chemical Formula 1].

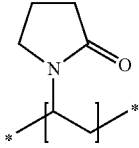

[Chemical Formula 1]

The polyvinyl pyrrolidone has hydrophilicity and high surface hardness at the same time, therefore, when a protective layer containing the polyvinyl pyrrolidone is formed, a polyamide active layer may be protected from scratches and the like generated during a module manufacturing process or a transport process.

Meanwhile, as described above, a polyvinyl alcohol-based protective layer formed for durability enhancement of a polyamide active layer in the art is able to contribute to the durability enhancement of a separation membrane, however, has had a problem in that the protective layer is not readily removed. When the protective layer remains after manufacturing a water treatment module, there are problems in that performances of the separation membrane including permeate flow is degraded, and the separation membrane is damaged when being washed with high-temperature water to remove the protective layer.

However, polyvinyl pyrrolidone used in the present invention is favorably dissolved in water at room temperature, therefore, is readily coated on the surface of a polyamide active layer, and a protective layer may be readily removed just by washing with room temperature water after module preparation is complete.

In addition, the weight average molecular weight of the polyvinyl pyrrolidone may be approximately 10,000 to 1,000,000, preferably approximately 10,000 to 100,000, and more preferably approximately 10,000 to 40,000. When the weight average molecular weight of the polyvinyl pyrrolidone satisfies the above range, polyvinyl pyrrolidone permeates into a support layer, therefore, performance loss due to a pore-blocking phenomenon may be prevented.

Herein, the polyvinyl pyrrolidone has solubility value of 5% or greater for water at 25° C., and more preferably has solubility value of 10% or 20% or greater. Polyvinyl pyrrolidone of which solubility value satisfies the above range forms a protective layer thereby allows a separation membrane to be stored and distributed in a dried state, and at the same time, simplifies a process since the separation membrane may be readily washed with room temperature water.

Meanwhile, the thickness of the protective layer may be approximately 0.5 nm to 1000 nm, preferably approximately 0.5 nm to 500 nm, and more preferably approximately 0.5 nm to 300 nm. When the thickness of the protective layer satisfies the above range, sufficient durability may be provided to a separation membrane, and performance loss due to drying may be reduced when the separation membrane is dried. More specifically, when the thickness of the protective layer is less than 0.5 nm, the protective layer is not sufficiently formed, and a durability enhancement effect may not be obtained. In addition, the thickness of the protective layer being greater than 1,000 nm is uneconomical since performance improvement of the separation membrane may not be expected, and initial permeate flow efficiency may be reduced.

Meanwhile, in the water treatment separation membrane of the present invention, the protective layer may further include a polymer including an amine group-containing compound, an epoxy group-containing compound and a fluoro-containing compound.

More specifically, the protective layer may be formed as a single protective layer including a polymer that includes an amine group-containing compound, an epoxy group-containing compound and a fluoro-containing compound together with polyvinyl pyrrolidone, or, to have a two-layer structure formed with a first protective layer including a polymer that includes an amine group-containing compound, an epoxy group-containing compound and a fluoro-containing compound, and a second protective layer formed on the top of the first protective layer through a separate coating process and including polyvinyl pyrrolidone.

Meanwhile, the polymer may be formed by polymerizing an amine group-containing compound, an epoxy group-containing compound and a fluoro-containing compound, and for example, may be produced by dissolving an amine group-containing compound in deionized water, then adding a fluoro-containing compound thereto, and mixing and reacting the result for 30 minutes to 60 minutes, and adding an epoxy group-containing compound thereto and polymerizing the result for 15 minutes to 30 hours.

Herein, the amine group-containing compound allows the protective layer and the polyamide active layer strongly binding to each other by the amine groups present at both ends covalent bonding to unreacted groups of the polyamide active layer, and also provides a function that increases fouling resistance of a water treatment separation membrane due to the presence of a backbone having hydrophilicity. The amine group-containing compound capable of being used in the present invention may preferably be a compound in which amine groups are attached to both ends, and more preferably, a compound in which amine groups substitute both ends of polyalkylene glycol, and herein, the polyalkylene glycol may include polyethylene glycol, polypropylene glycol and the like.

For example, the amine group-containing compound capable of being used in the present invention may be a compound represented by the following Chemical Formula 2.

[Chemical Formula 2]

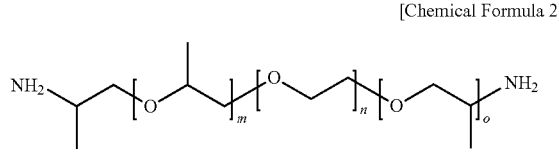

In Chemical Formula 2, m is an integer of 0 to 10, n is an integer of 0 to 15, and o is an integer of 0 to 10.

The amine group-containing compound capable of being used in the present invention may use commercially available products and examples thereof may include Jeffamine (manufacturer: Huntsman International LLC) and the like.

Next, the epoxy group-containing compound forms a polymer having a long chain by the epoxy groups present at both ends reacting with the amine group-containing compound, and accordingly, salt rejection of a water treatment separation membrane is improved, and remaining epoxy groups that do not react with amine covalently bonds to unreacted groups of the polyamide active layer, therefore, the protective layer and the polyamide active layer strongly bind to each other to obtain a stable protective layer. In addition, the epoxy group-containing compound also provides a function that increases fouling resistance of a water treatment separation membrane due to the presence of a backbone having hydrophilicity. Examples of the epoxy group-containing compound capable of being used in the present invention may include one or more types selected from among compounds that are water soluble and attached with two or more epoxy groups such as a (poly)ethylene-based epoxy resin, a (poly)glycerin-based epoxy resin and a (poly)sorbitol-based epoxy resin, and.

More preferably, the epoxy group-containing compound capable of being used in the present invention may be a compound represented by the following Chemical Formula 3.

[Chemical Formula 3]

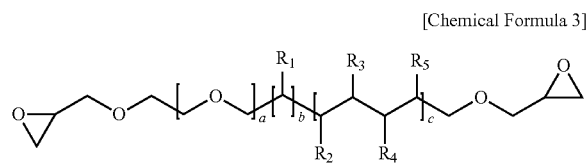

In Chemical Formula 3, $R_1$ is hydrogen or a hydroxyl group; $R_2$ to $R_5$ are each independently hydrogen, a hydroxyl group or an alkoxyalkyl oxirane group; a is an integer of 0 to 150, preferably an integer of 3 to 150, and more preferably an integer of 3 to 50; b is an integer of 0 to 3 and preferably an integer of 0 or 1; c is an integer of 0 to 5 and preferably 0 or 1.

More specifically, examples of the epoxy group-containing compound capable of being used in the present invention may include one or more types selected from the group consisting of compounds represented by the following Chemical Formula 4 to Chemical Formula 6.

[Chemical Formula 4]

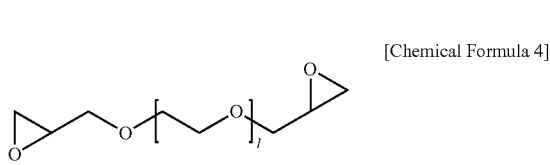

In Chemical Formula 4, l is an integer of 4 to 150.

[Chemical Formula 5]

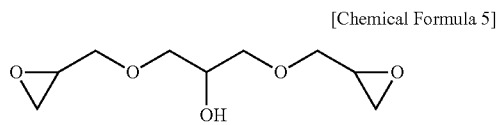

[Chemical Formula 6]

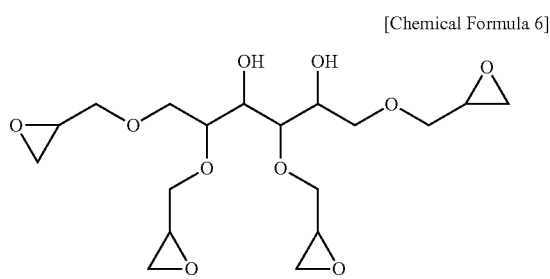

Meanwhile, the amine group-containing compound and the epoxy-containing compound are preferably included in a weight ratio of 10:1 to 1:1. This is due to the fact that, when the content ratio of the amine group-containing compound and the epoxy group-containing compound satisfies the above range, the amine group-containing compound and the epoxy group-containing compound lengthen the chain length of materials forming a protective layer as they are reacted and therefore, make the salt rejection more effective.

Next, the fluoro-containing compound is for providing an anti-fouling property to a water treatment separation membrane, and the fluoro-containing compound capable of being used in the present invention may include fluoro group-substituted $C_{1\sim20}$ alkylene, aryl alkylene, alkylene oxide, alkenylene, aryl alkenylene or alkenylene oxide compound, or the like, and specific examples thereof may include $F(CF_2)_3O[CF(CF_3)CF_2O]_3CF(CF_3)COF$, $CHF_2CF_2CF_2CH_2OCH_2CHCH_2O$, $CHF_2CF_2CF_2CF_2CH_2OCH_2CHCH_2O$, $F(CH_2)_{10}COOH$, $F(CH_2)_7COCl$, $F(CH_2)_{10}CH_2CH_2OH$, $F(CH_2)_8CH_2CH_2OH$, $(CF_3)_2CCH_3COF$, $F(CF_2)_6CH_2CHCH_2O$, $CF_3CHCHCOCl$, $F(CF_2)_6CH_2NH_2$ and the like.

Meanwhile, the polymer including the amine group-containing compound, the epoxy group-containing compound and the fluoro-containing compound may include at least one or more of compounds represented by the following Chemical Formulae 7 and 8.

[Chemical Formula 7]

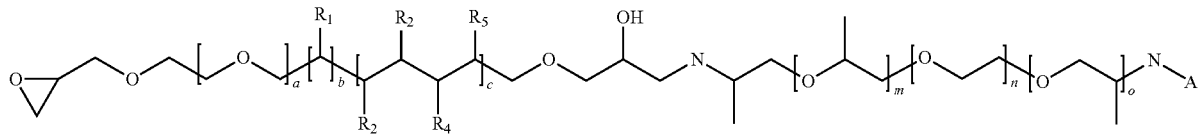

In Chemical Formula 7, A is fluoro group-substituted $C_{1\sim 20}$ alkylene, aryl alkylene, alkylene oxide, alkenylene, aryl alkenylene or alkenylene oxide; $R_1$ is hydrogen or a hydroxyl group; $R_2$ to $R_5$ are each independently hydrogen, a hydroxyl group or an alkoxyalkyl oxirane group; a is an integer of 0 to 150, preferably an integer of 3 to 150 and more preferably an integer of 3 to 50; b is an integer of 0 to 3 and preferably 0 or 1; c is an integer of 0 to 5 and preferably 0 or 1; m is an integer of 0 to 10; n is an integer of 0 to 15; and o is an integer of 0 to 10.

[Chemical Formula 8]

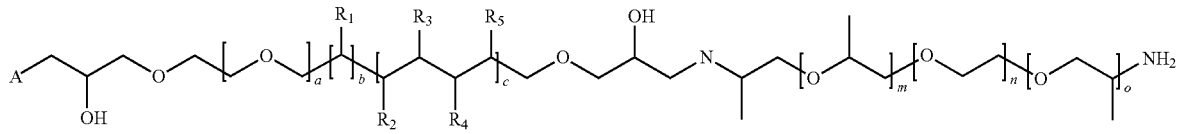

In Chemical Formula 8, A is fluoro group-substituted $C_{1\sim 20}$ alkylene, aryl alkylene, alkylene oxide, alkenylene, aryl alkenylene or alkenylene oxide; $R_1$ is hydrogen or a hydroxyl group; $R_2$ to $R_5$ are each independently hydrogen, a hydroxyl group or an alkoxyalkyl oxirane group; a is an integer of 0 to 150, preferably an integer of 3 to 150 and more preferably an integer of 3 to 50; b is an integer of 0 to 3 and preferably 0 or 1; c is an integer of 0 to 5 and preferably 0 or 1; m is an integer of 0 to 10; n is an integer of 0 to 15; and o is an integer of 0 to 10.

Meanwhile, more preferably, in Chemical Formulae 6 and 7, A may be $F(CF_2)_3O[CF(CF_3)CF_2O]_3CF(CF_3)$ $CHF_2CF_2CH_2OCH_2CHOHCH_2—$, $CHF_2CF_2CF_2CF_2CH_2OCH_2CHOHCH_2—$, $F(CH_2)_{10}CO—$, $F(CH_2)_7CO—$, $F(CH_2)_{10}CH_2CH_2O—$, $F(CH_2)_8$ $CH_2CH_2O—$, $(CF_3)_2CCH_3CO—$, $F(CF_2)_6$ $CH_2CHOHCH_2—$, $CF_3CHCHCO—$ and $F(CF_2)_6$ $CH_2NH—$.

As described above, when the protective layer further includes a polymer including an amine group-containing compound, an epoxy group-containing compound and a fluoro-containing compound, the fluoro is attached to the surface of the polyamide active layer, and adsorption of contaminants to the surface of a separation membrane is prevented due to the fluoro-specific water repellency/oil repellency, and particularly, a bio-fouling prevention effect by organic materials is superior due to the backbone having hydrophilicity.

Meanwhile, the water treatment separation membrane of the present invention has moisture content of approximately 1% to 8%, and preferably has moisture content of approximately 1% to 6%, or 2% to 5%. More specifically, the water treatment separation membrane of the present invention has a moisture content range described above not only immediately after the preparation but also after the membrane is stored for 500 hours under a closed condition at 25° C.

According to the test results carried out by the inventors of the present invention, the dried water treatment separation membrane of the present invention has excellent moisture content, and consequently, has excellent salt rejection and permeate flow. Particularly, excellent moisture content is maintained even when the membrane is stored for a long period of time under the condition described above, therefore, efficiency that is equal to or more superior than the efficiency of wet separation membranes may be maintained even when storing the membrane for a long period of time at room temperature. Meanwhile, the moisture content is, as described in the test examples below, employed as a weight change ratio calculated by measuring the weight of a specimen prepared by cutting a dried separation membrane into 5 cm×20 cm, completely drying the specimen at 100° C., and then measuring the weight after drying.

According to the test results carried out by the inventors of the present invention, such a polyamide-based water treatment separation membrane including a protective layer described above greatly improves physical durability against external stimulus. More specifically, as described in the examples and the comparative examples below, when a durability test scraping the surface once at a rate of 30 mm/s using a bar coater (Mayer bar; #50 wired bar) is carried out, the water treatment separation membrane according to the present invention was shown to have a very small salt rejection change ratio of 1% or less and a permeate flow change ratio of 12% or less, and preferably shown to have a salt rejection change ratio and a permeate flow change ratio of 0.5% or less and 10% or less, respectively. This shows that the water treatment separation membrane of the present invention has very excellent durability with very small changes in water treatment capabilities even when damages and scrapes occur on the membrane surface. In comparison, an existing water treatment separation membrane that does not include a polyvinyl pyrrolidone protective layer shows a large change ratio having a salt rejection change ratio and a permeate flow change ratio of approximately 2.35% and 14.7%, respectively.

In addition, in the existing water treatment separation membrane that does not include a polyvinyl pyrrolidone protective layer, salt rejection is approximately 97% and permeate flow decreases to 30 gallon/ft²·day after the durability test such as above, however, the water treatment separation membrane according to the present invention exhibits excellent salt rejection of 98% or greater, preferably 99% or greater, and permeate flow of approximately 32 to 35 gallon/ft$^2$·day after the durability test. Herein, the salt rejection and the permeate flow were measured under a pressure of 800 psi in an aqueous NaCl solution having a concentration of 32000 ppm.

Moreover, according to the test results carried out by the inventors of the present invention, the polyamide-based water treatment separation membrane according to the present invention has salt rejection of 99.3% or greater in a dried state when measured in an aqueous NaCl solution having a concentration of 32000 ppm under a pressure of 800 psi, and has permeate flow of approximately 30 to 45 gallon/ft$^2$·day. Generally, when a polyamide-based water treatment separation membrane is dry, the efficiency of the film significantly decreases, and accordingly, the separation membrane needs to be kept in a wet state in a post-treatment process and a modularization process of the separation membrane. However, in the water treatment separation membrane of the present invention, efficiency decrease of the separation membrane is very low even in a dried state, therefore, the membrane may be stored, transported, and processed in a dried state.

In addition, according to the research results carried out by the inventors of the present invention, the polyamide-based water treatment separation membrane of the present invention has an excellent anti-fouling property compared to existing water treatment separation membranes even after a polyvinyl pyrrolidone-including protective layer is removed by washing. It is believed that that the water treatment separation membrane of the present invention has an anti-fouling property since an extremely small amount of polyvinyl pyrrolidone remains on the surface of the polyamide active layer after washing, and therefore, resistance against hydrophobic contaminants is improved by the polyvinyl pyrrolidone having hydrophilicity.

More specifically, the water treatment separation membrane of the present invention may be manufactured by washing the water treatment separation membrane including the polyvinyl pyrrolidone-including protective layer 1 to 5 times with water. Herein, the washing is not particularly limited, but may be carried out, for example, 1 to 5 times with ultrapure water for approximately 5 minutes under a pressure of 800 psi.

According to the research results carried out by the inventors of the present invention, the water treatment separation membrane of the present invention washed as described above has salt rejection of 99% or greater and preferably 99.5% or greater, and maintains permeate flow at approximately 25 to 35 gallon/ft$^2$·day after 6 hours pass after a mixed aqueous solution containing sodium chloride (NaCl) having a concentration of 32,000 ppm and albumin having a concentration of 100 ppm is introduced under a pressure of 800 psi, and this shows that the efficiency decrease of the film due to contaminants is very small. In comparison, the permeate flow of the existing water treatment separation membrane significantly decreases to 25 gallon/ft$^2$·day or less. In other words, the water treatment separation membrane according to the present invention is shown to have a permeate flow change ratio of 10% or less.

Meanwhile, the water treatment separation membrane including the constituents described above may be used for a microfiltration membrane, an ultrafiltration membrane, a nanofiltration membrane, a reverse osmosis membrane or the like, and may be particularly preferably used for a reverse osmosis membrane.

In addition, the present invention relates to a water treatment module including at least one or more of the water treatment separation membranes according to the present invention described above.

Specific types of the water treatment module of the present invention are not particularly limited, and examples thereof include a plate & frame module, a tubular module, a hollow & fiber module, a spiral wound module or the like. In addition, the water treatment module of the present invention is not particularly limited in other constitutions and manufacturing methods as long as the water treatment module includes the water treatment separation membrane of the present invention described above, and general means known in the art may be employed without limit.

Meanwhile, the water treatment module of the present invention has excellent salt rejection and permeate flow, and has excellent chemical stability, therefore, may be favorably used for water treatment equipment such as household/industrial water purification equipment, sewage treatment equipment and seawater desalination equipment.

Next, a method for manufacturing the water treatment separation membrane of the present invention will be described.

More specifically, a method for manufacturing the water treatment separation membrane of the present invention includes forming a polyamide active layer on a porous support; and forming a protective layer on the polyamide active layer using an aqueous solution including 0.005% by weight to 7% by weight of polyvinyl pyrrolidone based on the whole aqueous solution.

Herein, the operation of forming a polyamide active layer on a porous support is not particularly limited, and methods for manufacturing a polyamide-based a separation membrane well known in the art may be used. More specifically, the method for manufacturing the polyamide active layer may include forming an aqueous solution layer including an amine compound on a porous support and contacting an organic solution including acyl halide on the aqueous solution layer.

For example, the polyamide active layer may be formed from forming an m-phenylenediamine (mPD) layer by immersing the porous support in an aqueous mPD solution, then contacting and interfacial polymerizing the mPD layer with a trimesoyl chloride (TMC) layer by immersing the mPD layer in an organic TMC solvent. In addition, the polyamide active layer may also be formed using methods such as a spray method or a coating method instead of an immersion method.

Next, the operation of forming a protective layer on the polyamide active layer using an aqueous solution including polyvinyl pyrrolidone is not particularly limited, and may be carried out using contact methods well known in the art such as immersion, application, spray and surface coating.

Herein, the operation of forming a protective layer is preferably carried out for approximately 1 to 60 seconds, and more preferably for approximately 10 to 30 seconds. When the time for forming a protective layer satisfies the above range, the protective layer is sufficiently formed and an effect of enhancing the durability of a separation membrane may be expected, and proper permeate flow may be maintained.

Meanwhile, the aqueous solution for forming a protective layer may include polyvinyl pyrrolidone in 0.005% by weight to 7% by weight with respect to the whole aqueous solution, preferably in approximately 0.01% by weight to 7% by weight, and more preferably in approximately 0.01% by weight to 5% by weight. When the content of the polyvinyl pyrrolidone satisfies the above range, efficiency decrease when a separation membrane is dried, resistance against external stimulus, and economic feasibility of a process may be improved, and a protective layer having a thickness of 0.5 nm to 1000 nm may be prepared.

When the protective layer is formed on the polyamide active layer using methods such as above, an operation of drying for approximately 5 minutes to 30 minutes at approximately 25° C. to 65° C. is preferably carried out in order to improve adhesion between the protective layer and the polyamide active layer.

Meanwhile, in a method for manufacturing a water treatment separation membrane further including a polymer that includes an amine group-containing compound, an epoxy group-containing compound and a fluoro-containing compound in a polyvinyl pyrrolidone-including protective layer, the operation of forming the protective layer on the polyamide active layer may use the following two methods depending on whether two protective layers are formed, or a single protective layer is formed, as described above.

First, in a water treatment separation membrane formed with two protective layers, the operation of forming a protective layer may include forming a first protective layer on a polyamide active layer using an aqueous solution including an amine group-containing compound, an epoxy group-containing compound and a fluoro-containing compound; and forming a second protective layer on the top of the first protective layer using an aqueous solution including polyvinyl pyrrolidone.

The operation of forming a first protective layer may be carried out using various coating methods well known in the art such as an immersion method, a spray method and a wet application method, and for example, may be carried out through a method of immersing a support formed with a polyamide active layer in an aqueous solution including an amine group-containing compound, an epoxy group-containing compound and a fluoro-containing compound (hereinafter, referred to as an aqueous solution I for convenience).

In this case, the immersion time may be properly adjusted considering the thickness of the first protective layer to form, and the like, and for example, may be approximately 0.1 minutes to 10 hours, and preferably for approximately 1 minute to 1 hour. When the immersion time is less than 0.1 minutes, the first protective layer is not sufficiently formed, and when the immersion time is greater than 10 hours, the first protective layer becomes too thick having a negative effect of decreasing permeate flow of a separation membrane.

After the first protective layer is formed on the polyamide active layer through a process such as above, washing may be carried out as necessary. The washing may be carried out by, although not limited thereto, washing for 1 to 10 minutes, and preferably for 1 to 2 minutes using distilled water that is distilled three times after forming a first protective layer through a process such as above.

Meanwhile, the aqueous solution I may include an amine group-containing compound in 0.05% by weight to 10% by weight, an epoxy group-containing compound in 0.05% by weight to 10% by weight, a fluoro-containing compound in 0.001% by weight to 2% by weight, and solvent in the remaining content, with respect to the total weight, and may preferably include an amine group-containing compound in 0.5% by weight to 5% by weight, an epoxy group-containing compound in 0.5% by weight to 5% by weight, a fluoro-containing compound in 0.01% by weight to 1% by weight, and solvent in the remaining content.

Meanwhile, it is favorable that the amine group-containing compound may be included in approximately 0.05% by weight to 10% by weight, and preferably included in approximately 0.05% by weight to 5% by weight, with respect to the total weight of the aqueous solution I. When the content of the amine group-containing compound is greater than 10% by weight, permeate flow may significantly decrease as the protective layer becomes thick, and when the content is less than 0.05% by weight, an effect of anti-fouling property improvement is insignificant. In addition, it is favorable that the epoxy group-containing compound may be included in approximately 0.05% by weight to 10% by weight, and preferably included in approximately 0.05% by weight to 5% by weight, with respect to the total weight of the aqueous solution I. Similar to the amine compound, when the epoxy-containing compound is used in greater than 10% by weight, permeate flow may significantly decrease as the protective layer becomes thick, and when used in less than 0.5% by weight, an effect of anti-fouling property improvement is insignificant. Furthermore, the fluoro compound is difficult to be dissolved in the aqueous solution I when used in greater than 2% by weight, therefore, is not suitable for use. However, when the fluoro compound is used in less than 0.01% by weight, an anti-fouling effect is insignificant.

Meanwhile, the solvent may be water. Meanwhile, the remaining content means a remaining % by weight after excluding a solid component, that is, a total % by weight of the amine group-containing compound, the epoxy group-containing compound and the fluoro-containing compound from the total 100% by weight of the aqueous solution I. When the component content in the aqueous solution I satisfies the above range, the outer-most surface of the first protective layer is mostly formed with fluoro as the chain length of the materials forming the first protective layer becomes suitable, and as a result, an anti-fouling property may be effectively obtained while maintaining excellent permeate flow and salt rejection.

Next, the operation of forming a second protective layer may be carried out using a method of coating an aqueous solution including polyvinyl pyrrolidone on the top of the first protective layer (hereinafter, referred to as an aqueous solution II for convenience), and herein, the coating method, the coating time and the drying carried out thereafter are the same as those described in the operation of forming a protective layer on a polyamide active layer using an aqueous solution including polyvinyl pyrrolidone, therefore, detailed descriptions will not be repeated.

Meanwhile, the aqueous solution II may include polyvinyl pyrrolidone in 0.005% by weight to 7% by weight with respect to the whole aqueous solution II as described above, and may preferably include in 0.01% by weight to 5% by weight.

Secondly, in a water treatment separation membrane formed with a single protective layer including polyvinyl pyrrolidone together with a polymer that includes an amine group-containing compound, an epoxy group-containing compound and a fluoro-containing compound, the operation of forming a protective layer may include mixing an aqueous solution including soluble polyvinyl pyrrolidone, and an aqueous solution including an amine group-containing compound, an epoxy group-containing compound and a fluoro-containing compound, and coating the result.

Herein, the operation of mixing an aqueous solution including an amine group-containing compound, an epoxy group-containing compound and a fluoro-containing compound (hereinafter, referred to as an aqueous solution III for convenience) and an aqueous solution including polyvinyl pyrrolidone (hereinafter, referred to as an aqueous solution IV for convenience), and coating the result on a polyamide active layer, may be carried out by, for example, separately preparing the aqueous solution III including an amine group-containing compound, an epoxy group-containing compound and a fluoro-containing compound and the aqueous solution IV including polyvinyl pyrrolidone, mixing the two aqueous solutions immediately before use, and coating the mixed aqueous solution on a support formed with a polyamide active layer.

For example, the coating may be carried out using a method of immersing a porous support formed with a polyamide active layer in the mixed aqueous solution of the aqueous solutions III and IV, and herein, the immersion time may be properly adjusted considering the thickness of a protective layer to form, and the like, and for example, is approximately 0.1 minutes to 10 hours, and preferably approximately 1 minute to 1 hour.

Meanwhile, the composition and the content range of the aqueous solution III and the aqueous solution IV are the same as the composition and the content range of the aqueous solution I and the aqueous solution II, and detailed descriptions will not be repeated.

Preparation Example

A uniform liquid was obtained by placing 18% by weight of polysulfone solid in an N,N-dimethylformamide (DMF) solution and dissolving the solid for 12 hours or longer at 80° C. to 85° C. This solution was casted to a thickness of 45 to 50 μm on nonwoven fabric having a thickness of 95 to 100 μm and made of a polyester material. Next, a porous polysulfone support was prepared by placing the casted nonwoven fabric in water.

The porous polysulfone support prepared using the above method was immersed in an aqueous solution including 2% by weight of meta-phenylenediamine, 1% by weight of triethylamine and 2.3% by weight of camphorsulfonic acid for 2 minutes, then the excess aqueous solution on the support was removed using a 25 psi roller, and the result was dried for 1 minute at room temperature.

After that, the coated support was immersed in an organic solution including 0.1% by volume of trimesoyl chloride (TMC) in an Isol C solvent (SKC corp.) for 1 minute, and then the result was dried for 10 minutes in an oven at 60° C. in order to remove the excess organic solution.

The water treatment separation membrane obtained using the above method was immersed in 0.2% by weight of an aqueous sodium carbonate solution for 2 hours or longer, and then washed again with distilled water for 1 minute, and as a result, a water treatment separation membrane having a polyamide active layer was manufactured.

Example 1

A protective layer was formed on the polyamide active layer of the water treatment separation membrane manufactured in Preparation Example by surface coating 0.01% by weight of an aqueous polyvinyl pyrrolidone (weight average molecular weight: 29000) solution for 10 seconds. After that, the excess aqueous polyvinyl pyrrolidone solution remaining on the surface was drained off, and the result was dried for 10 minutes in an oven at 60° C., and as a result, a highly durable water treatment separation membrane was manufactured. Herein, the thickness of the coating layer after drying was 3 nm.

Example 2

A water treatment separation membrane was manufactured in the same manner as in Example 1 except that polyvinyl pyrrolidone was used in 0.1% by weight instead of 0.01% by weight. Herein, the thickness of the coating layer after drying was 30 nm.

Example 3

A water treatment separation membrane was manufactured in the same manner as in Example 1 except that the polyvinyl pyrrolidone was used in 1% by weight instead of 0.01% by weight. Herein, the thickness of the coating layer after drying was 300 nm.

Example 4

After 0.5% by weight of Jeffamine (weight average molecular weight: 1900) was dissolved in deionized water (DIW), 0.07% by weight of $F(CF_2)_3O[CF(CF_3)CF_2O]_3CF(CF_3)COF$ was added and reacted thereto, and an aqueous solution I for forming a protective layer was prepared by adding and reacting 0.5% by weight of polyethylene glycol diglycidyl ether (PEGDE, weight average molecular weight: 526) thereto. Herein, the solid concentration of the aqueous solution I was 1.07% by weight.

A first protective layer was formed by immersing the porous support having a polyamide active layer obtained in Preparation Example in the aqueous solution I for forming a protective layer, and then washing the result using distilled water that is distilled three times.

After that, an aqueous solution II for forming a protective layer including polyvinyl pyrrolidone (weight average molecular weight: 29000) in 1% by weight was prepared, and then the aqueous solution II was coated on the top of the first protective layer for 10 seconds. Then, a second protective layer was formed by draining off the excess aqueous solution II including polyvinyl pyrrolidone remaining on the surface and drying the result for 10 minutes in an oven at 60° C. Herein, the thickness sum of the first protective layer and the second protective layer was 300 nm.

Example 5

After 0.1% by weight of Jeffamine (weight average molecular weight: 1900) was dissolved in deionized water (DIW), 0.014% by weight of $F(CF_2)_3O[CF(CF_3)CF_2O]_3CF(CF_3)COF$ was added and reacted thereto, and an aqueous solution III for forming a protective layer was prepared by dissolving adding and reacting, and then adding and reacting 0.1% by weight of polyethylene glycol diglycidyl ether (PEGDE, weight average molecular weight: 526) thereto. Herein, the solid concentration of the aqueous solution III was 0.214% by weight.

A single protective layer was formed by mixing the aqueous solution III for forming a protective layer having a concentration of 0.214% by weight and an aqueous solution IV for forming a protective layer having a concentration of 1% by weight, then immersing the porous support having a polyamide active layer obtained in Preparation Example in the mixed aqueous solution for 1 minute, and then washing the result with distilled water that is distilled three times. Herein, the thickness of the protective layer was 300 nm after drying.

Comparative Example 1

A water treatment separation membrane in a dried state was manufactured by drying the water treatment separation membrane manufactured in Preparation Example for 10 minutes in an oven at 60° C.

Comparative Example 2

A protective layer was formed by surface coating 1% by weight of an aqueous polyvinyl alcohol (weight average molecular weight: 31,000) solution on the polyamide active layer of the water treatment separation membrane manufactured in Preparation Example for 10 seconds. After that, a water treatment separation membrane was manufactured by draining off the excess polyvinyl alcohol aqueous solution remaining on the surface, and drying the result for 10 minutes in an oven at 60° C.

Comparative Example 3

A water treatment separation membrane was manufactured in the same manner as in Example 1 except that the polyvinyl pyrrolidone was used in 0.001% by weight instead of 0.01% by weight. Herein, the thickness of the coating layer was approximately 0.3 nm after drying.

Comparative Example 4

A water treatment separation membrane was manufactured in the same manner as in Example 1 except that the polyvinyl pyrrolidone was used in 10% by weight instead of 0.01% by weight. Herein, the thickness of the coating layer was approximately 3,000 nm after drying.

Reference Example

The water treatment separation membrane manufactured in Preparation Example was used in a wet state without drying.

Test Example 1—Initial Salt Rejection and Initial Permeate Flow Measurements Initial salt rejection and initial permeate flow of the water treatment separation membrane manufactured in Examples 1 to 3, Comparative Examples 1 to 4, and Reference Example were evaluated as follows. Initial salt rejection and initial permeate flow were each measured while supplying an aqueous sodium chloride solution each having a concentration of 32,000 ppm under a pressure of 800 psi, or having a concentration of 2,000 ppm under a pressure of 250 psi, with a flow rate of 4500 mL/min at 25° C. Water treatment separation membrane cell equipment used in the membrane evaluation was equipped with a flat-type permeation cell, a high pressure pump, a storage tank and cooling equipment, and the structure of the flat-type permeation cell was a cross-flow type and had a valid permeation area of 140 cm$^2$. After the washed water treatment separation membrane was installed in the permeation cell, sufficient preoperational tests were carried out for approximately 1 hour using distilled water that is distilled three times for evaluation equipment stabilization. Next, an equipment operation was carried out for approximately 1 hour after changing to an aqueous sodium chloride solution having a concentration of 32,000 ppm until pressure and permeate flow reached a stationary state, and flow was calculated by measuring the amount of water permeated for 10 minutes, and salt rejection was calculated by analyzing the salt concentration before and after permeation using a conductivity meter. The measurement results are shown in the following [Table 1].

TABLE 1

| Category | Initial Value | |
|---|---|---|
| | Salt Rejection (%) | Permeate Flow (GFD) |
| Example 1 | 99.40 | 31.91 |
| Example 2 | 99.46 | 32.67 |
| Example 3 | 99.48 | 32.44 |
| Comparative Example 1 | 99.23 | 28.17 |
| Comparative Example 2 | 99.27 | 25.61 |
| Comparative Example 3 | 99.37 | 31.78 |
| Comparative Example 4 | 99.45 | 30.15 |
| Reference Example | 99.45 | 36.06 |

Through the measurement results in Comparative Example 1 of [Table 1], it was seen that the water treatment separation membrane in which the polyvinyl pyrrolidone protective layer was not formed had significantly decreased salt rejection and permeate flow in a dried state when comparing to the water treatment separation membrane in a wet state (Reference Example). However, in the water treatment separation membrane in Examples 1 to 3 formed with the polyvinyl pyrrolidone protective layer, it was identified that initial salt rejection in a dried state was maintained at a level equal to the water treatment separation membrane in a wet state (Reference Example), and the rate of permeate flow decrease was very low. In addition to this, it was identified that the water treatment separation membrane in Examples 1 to 3 also had significantly superior salt rejection and permeate flow efficiency compared to the water treatment separation membrane in Comparative Example 2 formed with a polyvinyl alcohol-based protective layer. In addition, it was seen that, in Comparative Example 4, the protective layer was excessively thick, and as a result, initial permeate flow decreased compared to Examples 1 to 3.

Test Example 2—Physical Durability Evaluation

Durability of the water treatment separation membrane manufactured in Examples 1 to 5 and Comparative Examples 1, 3 and 4 was evaluated as follows. First, the surface of the separation membrane was scraped once at a rate of 30 mm/s using a bar coater (Mayer bar; #50 wired bar) used for bar coating, and salt rejection and permeate flow were measured using the same methods as in Test Example 1, and a change ratio was measured by comparing the results with initial salt rejection and permeate flow. Herein, the initial salt rejection and the initial permeate flow were the performances of the water treatment separation membrane manufactured according to Preparation Example before forming a protective layer (Reference Example). The measurement results are shown in the following [Table 2].

TABLE 2

| Category | After Scraping Surface | | Change Ratio after Scraping Surface | |
|---|---|---|---|---|
| | Salt Rejection (%) | Permeate Flow (GFD) | Change Ratio (%) in Salt Rejection | Change Ratio (%) in Permeate Flow |
| Example 1 | 99.25 | 32.06 | 0.20 | 11.1 |
| Example 2 | 99.42 | 32.84 | 0.03 | 8.9 |
| Example 3 | 99.50 | 32.62 | 0.05 | 9.5 |
| Comparative Example 1 | 97.11 | 30.75 | 2.35 | 14.7 |
| Comparative Example 3 | 97.95 | 32.75 | 1.51 | 9.2 |
| Comparative Example 4 | 99.48 | 30.33 | 0.03 | 15.9 |

As seen from the results in [Table 2], it was seen that, in Examples 1 to 3 in which the protective layer formed with polyvinyl pyrrolidone was formed on the polyamide active layer, the salt rejection change ratio was 1% or less meaning almost no changes, and the permeate flow change ratio was 12% or less, however, in Comparative Examples 1 and 3, the salt rejection and permeate flow change ratios were very large showing that efficiency decrease due to scratches occurred.

Test Example 3—Anti-Fouling Property Evaluation after Washing

An anti-fouling property of the water treatment separation membrane manufactured in Examples 2, 4 and 5 and Comparative Examples 1 and 2 was evaluated as follows. First, the water treatment separation membrane was washed with ultrapure water for 5 minutes under a pressure of 800 psi, and an anti-fouling property was measured using a mixed aqueous solution containing 32,000 ppm of an aqueous sodium chloride solution and 100 ppm of albumin (BSA) under a pressure of 800 psi. After measuring initial salt rejection and initial permeate flow, salt rejection and initial permeate flow were measured again after 6 hours had passed. The measurement results are shown in [Table 3].

TABLE 3

| Category | Salt Rejection (%) | | Permeate Flow (GFD) | |
|---|---|---|---|---|
| | Immediately before Albumin Introduction | 6 Hours after Albumin Introduction | Immediately before Albumin Introduction | 6 Hours after NaOCl Introduction |
| Example 2 | 99.43 | 99.51 | 32.67 | 29.47 |
| Example 4 | 99.59 | 99.67 | 28.67 | 26.96 |
| Example 5 | 99.60 | 99.67 | 28.04 | 26.22 |
| Comparative Example 1 | 99.19 | 99.38 | 29.00 | 24.65 |
| Comparative Example 2 | 99.24 | 99.38 | 25.38 | 21.06 |

As seen from the results in [Table 3], the permeate flow change ratio after 6 hours from the introduction of albumin was approximately 6.5% to 9.8% in Examples 2, 4 and 5, however, the permeate flow change ratio was approximately 15% and 17% in Comparative Examples 1 and 2, respectively. This shows that the membrane was damaged by contaminants in Comparative Examples 1 and 2. In comparison, in Examples 2, 4 and 5, it was seen that membrane damage was small even after contamination since resistance against contaminants was improved by the remaining polyvinyl pyrrolidone after washing.

Test Example 4—Moisture Content Evaluation

Moisture content of the water treatment separation membrane manufactured in Example 1 and Comparative Examples 1 and 2 was evaluated as follows. A specimen was prepared after the water treatment separation membrane was manufactured according to Example 1 and Comparative Examples 1 and 2, and cut into 15 cm×20 cm, and the weight of the specimen was measured, and then the weight of the specimen was measured after completely drying the specimen in an oven at 100° C., and the weight change ratio was employed as moisture content as shown in the following Mathematical Formula 1. Herein, the moisture content was measured as the value immediately after drying the manufactured separation membrane, and the value after storing the separation membrane for 500 hours under a closed condition at 25° C. The measurement results are shown in the following [Table 4].

[Mathematical Equation 1]

$$\text{Moisture Content} = \frac{\left(\begin{array}{c}\text{Weight of Specimen Before Completely Drying} - \\ \text{Weight of Specimen After Completely Drying}\end{array}\right)}{\text{Weight of Specimen Before Completely Drying}} \times 100$$

TABLE 4

| Category | Moisture Content Immediately after Drying | Moisture Content after Storing for 500 Hours |
|---|---|---|
| Example 1 | 3.3% | 2.8% |
| Comparative Example 1 | 0.86% | 0.44% |
| Comparative Example 2 | 3.2% | 1.1% |

As seen from the results in [Table 4], the water treatment separation membrane of the present invention had significantly higher moisture content compared to Comparative Example 1 in which a protective layer was not formed. Meanwhile, it was identified that Comparative Example 2 using an existing polyvinyl alcohol-based protective layer had excellent initial moisture content, however, the moisture content greatly decreased after a long period of time.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. A water treatment separation membrane comprising:

a porous support;

a polyamide active layer formed on the porous support; and a protective layer formed on the polyamide active layer, the protective layer comprising polyvinyl pyrrolidone and a polymer including an amine group-containing compound, an epoxy group-containing compound and a fluoro-containing compound,
wherein a thickness of the protective layer is 0.5 nm to 1000 nm.

2. The water treatment separation membrane of claim 1, wherein the polyvinyl pyrrolidone has a weight average molecular weight of 10,000 to 1,000,000.

3. The water treatment separation membrane of claim 1, wherein the polyvinyl pyrrolidone has a solubility value of 5% or greater in water at 25° C.

4. The water treatment separation membrane of claim 1, wherein the protective layer includes a first protective layer including the polymer that includes the amine group-containing compound, the epoxy group-containing compound and the fluoro-containing compound; and
a second protective layer formed on the top of the first protective layer and including polyvinyl pyrrolidone.

5. The water treatment separation membrane of claim 1, wherein the amine group-containing compound is a compound in which amine groups are attached to both ends of polyalkylene glycol.

6. The water treatment separation membrane of claim 1, wherein the amine group-containing compound is a compound of Chemical Formula 2:

[Chemical Formula 2]

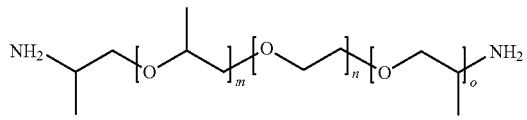

wherein, in Chemical Formula 2, m is an integer of 0 to 10, n is an integer of 0 to 15, and o is an integer of 0 to 10.

7. The water treatment separation membrane of claim 1, wherein the epoxy group-containing compound includes one or more types selected from the group consisting of a (poly)ethylene-based epoxy resin, a (poly)glycerin-based epoxy resin and a (poly)sorbitol-based epoxy resin, which include two or more epoxy groups.

8. The water treatment separation membrane of claim 1, wherein the epoxy group-containing compound is a compound of Chemical Formula 3:

[Chemical Formula 3]

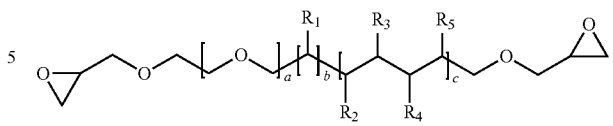

wherein, in Chemical Formula 3:
$R_1$ is hydrogen or a hydroxyl group;
$R_2$ to $R_5$ are each independently hydrogen, a hydroxyl group or an alkoxyalkyl oxirane group;
a is an integer of 0 to 150;
b is an integer of 0 to 3; and
c is an integer of 0 to 5.

9. The water treatment separation membrane of claim 1, wherein the amine group-containing compound and the epoxy group-containing compound are included in a weight ratio of 10:1 to 1:1.

10. The water treatment separation membrane of claim 1, wherein the fluoro-containing compound includes one or more types selected from the group consisting of $F(CF_2)_3O[CF(CF_3)CF_2O]_3CF(CF_3)COF$, $CHF_2CF_2CF_2CH_2OCH_2CHCH_2O$, $CHF_2CF_2CF_2CF_2CH_2OCH_2CHCH_2O$, $F(CH_2)_{10}COOH$, $F(CH_2)_7COCl$, $F(CH_2)_{10}CH_2CH_2OH$, $F(CH_2)_8CH_2CH_2OH$, $(CF_3)_2CCH_3COF$, $F(CF_2)_6CH_2CHCH_2O$, $CF_3CHCHCOC$, and $F(CF_2)_6CH_2NH_2$.

11. The water treatment separation membrane of claim 1, wherein the polymer including the amine group-containing compound, the epoxy group-containing compound and the fluoro-containing compound includes at least one or more compounds of Chemical Formulae 7 and 8:

[Chemical Formula 7]

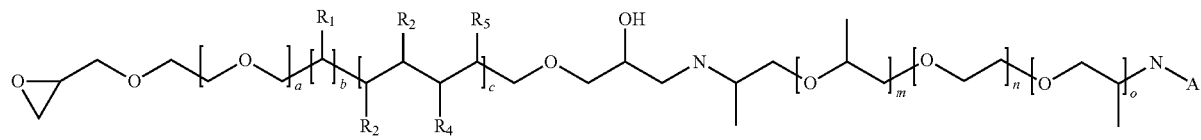

[Chemical Formula 8]

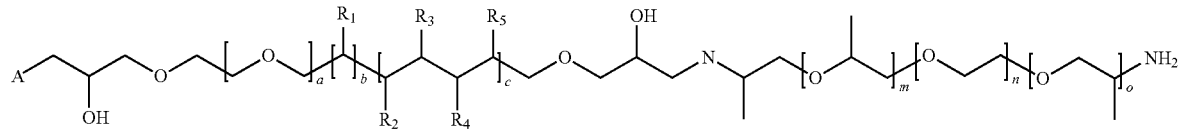

wherein, in Chemical Formulae 7 and 8:
A is a fluoro group-substituted $C_{1-20}$ alkylene group, an aryl alkylene group, an alkylene oxide group, an alkenylene group, an aryl alkenylene group or an alkenylene oxide group;
$R_1$ is hydrogen or a hydroxyl group;
$R_2$ to $R_5$ are each independently hydrogen, a hydroxyl group or an alkoxyalkyl oxirane group;
a is an integer of 0 to 150;
b is an integer of 0 to 3;
c is an integer of 0 to 5;
m is an integer of 0 to 10;
n is an integer of 0 to 15; and
o is an integer of 0 to 10.

12. The water treatment separation membrane of claim 11, wherein the A is $F(CF_2)_3O[CF(CF_3)CF_2O]_3CF(CF_3)CO-$, $CHF_2CF_2CF_2CH_2OCH_2CHOHCH_2-$, $CHF_2CF_2CF_2CF_2CH_2OCH_2CHOHCH_2-$, $F(CH_2)_{10}CO-$, $F(CH_2)_7CO-$, $F(CH_2)_{10}CH_2CH_2O-$, $F(CH_2)_8CH_2CH_2O-$, $(CF_3)_2CCH_3CO-$, $F(CF_2)_6CH_2CHOHCH_2-$, $CF_3CHCHCO-$ or $F(CF_2)_6CH_2NH-$.

13. The water treatment separation membrane of claim 1, which has a moisture content of 1% to 8%.

14. The water treatment separation membrane of claim 1, which has salt rejection of 99.3% or greater, and permeate flow of 30 to 45 gallon/ft$^2$·day or greater in a dried state.

15. The water treatment separation membrane of claim 1, which has a permeate flow change ratio of 10% or less after passing through an aqueous solution mixed with an aqueous sodium chloride solution having a concentration of 32,000 ppm, and albumin having a concentration of 100 ppm for 6 hours, compared to initial permeate flow.

16. A water treatment module comprising at least one or more of the water treatment separation membranes of claim 1.

17. A method for manufacturing a water treatment separation membrane comprising:
   forming a polyamide active layer on a porous support; and
   forming a protective layer on the polyamide active layer by:
   a) mixing a polymer including an amine group-containing compound, an epoxy group-containing compound and a fluoro-containing compound with an aqueous solution including 0.005% by weight to 7% by weight of polyvinyl pyrrolidone based on the whole aqueous solution to form a mixed aqueous solution, and coating the mixed aqueous solution on the polyamide active layer.

* * * * *